Figure 1:
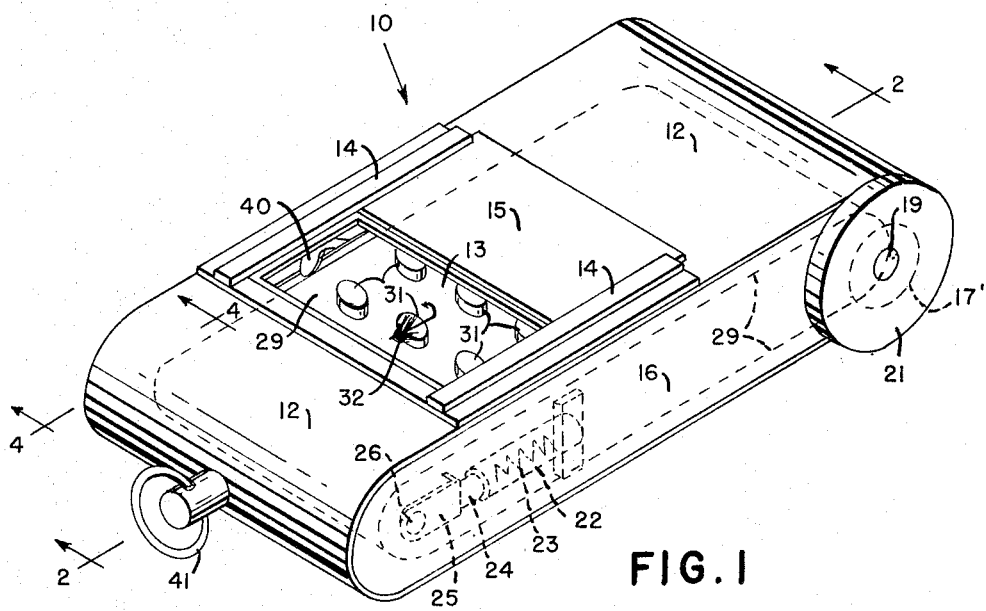

Nov. 22, 1966    F. L. GUICE    3,286,390
CONTAINER
Filed Sept. 30, 1964

INVENTOR.
FRANK L. GUICE
BY Robertson Smythe & Bryan
ATTORNEYS

United States Patent Office 3,286,390
Patented Nov. 22, 1966

3,286,390
CONTAINER
Frank L. Guice, 134 Martin Terrace, Bridgeport, Conn.
Filed Sept. 30, 1964, Ser. No. 400,419
9 Claims. (Cl. 43—57.5)

This invention relates to containers for storing fish hooks of the type commonly referred to as flies, and particularly to such a container capable of storing and dispensing any of a large number of such flies at the convenience of the fisherman.

Containers of this sort have heretofore been available but they have not proved too satisfactory in that during use, the endless belt supporting the flies often failed to move when needed. Furthermore, the means for supporting the flies was often unsatisfactory in that the flies frequently became dislodged from the endless belt. Additionally, when flies became dislodged it was extremely difficult to retrieve them from the interior of the case.

The principal object of the present invention is to provide a container for fishing flies that overcomes the above and other difficulties encountered with known containers of this type.

Another object of the invention is to provide such a container capable of being readily disassembled and reassembled.

Another object of the invention is to provide such a container in which an endless belt is maintained taut throughout the life of the container.

Another object of the invention is to provide such a container in which the fish hooks containing the flies are magnetically held to an endless belt.

In one aspect of the invention, the container may be composed of two main sections, one section comprising one side wall that is attached to top, bottom and end walls, and the other section comprising the other side wall on which is mounted the operating mechanism within the container.

In another aspect of the invention, the operating mechanism may comprise spaced plates extending the length of the side wall to which one of said plates is fixed. Shafts at each end of the plates may be journaled in aligned holes at each end of the plates.

In still another aspect of the invention, the aligned holes at one end of the plates are elongated and resilient means mounted on each plate are connected to the shaft through the elongated holes for urging said shaft away from the shaft at the other end of the plates.

In still another aspect of the invention, an endless belt may extend about the two spaced shafts, and the resilient means maintains the belt tight at all times. There is provided an intermediate idler shaft, parallel to the other two shafts, over which the endless belt passes.

In a further aspect of the invention, spaced rows of magnets may be permanently secured to the endless belt for magnetically holding the fish hooks to which the flies are attached.

In a still further aspect of the invention, the side wall supporting the top, bottom and end walls may act as an envelope for receiving the operating mechanism, and the top wall may be provided with an access opening that is closed by a sliding door.

In another aspect of the invention, a leaf spring may have its one end fixed to one side wall. The spring may extend transversely between the reaches of the endless belt, there being a hook formed on its free end for cooperation with a hook fixed to the other side wall. A pivoted lever operable through the opening in the top wall may be used to release the leaf spring when it is desired to disassemble the two sections. The entire container may be made from transparent plastic so that a desired fly can be easily located.

The above, other objects and novel features of the improved fly container will become apparent from the following specification and accompanying drawing which are merely exemplary.

Figure 2:
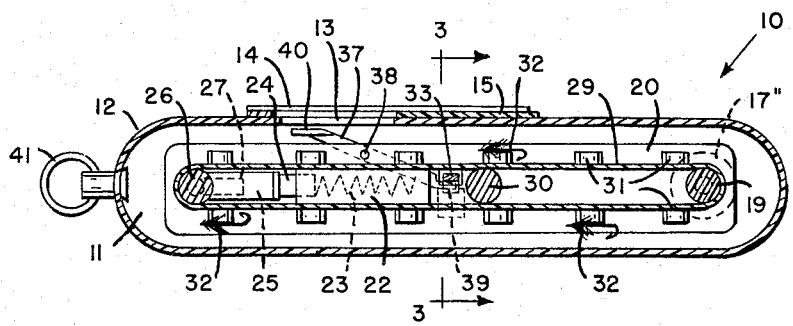
Figure 3:
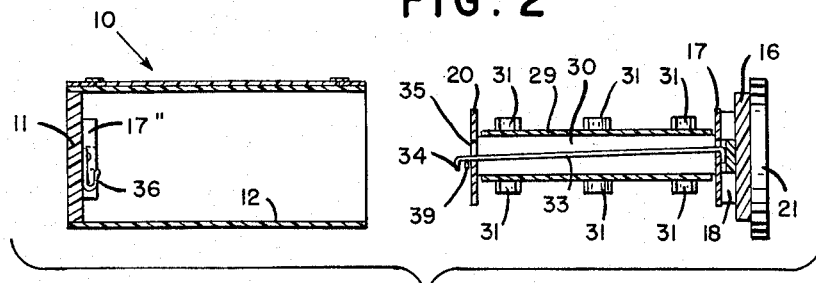
Figure 4:
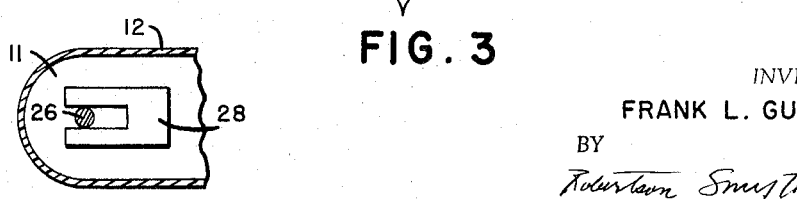

In the drawing:
FIG. 1 is a perspective view of a fishing fly container to which the principles of the invention have been applied;
FIG. 2 is a longitudinal sectional elevational view taken substantially along line 2—2 of FIG. 1;
FIG. 3 is an exploded view of the container, taken substantially along line 3—3 of FIG. 2; and
FIG. 4 is a sectional view taken substantially along line 4—4 of FIG. 1.

Referring to the drawing, the principles of the invention are shown as applied to a fish hook container comprising a portion 10, including a side wall 11 (FIG. 3), preferably made from a transparent plastic. Side wall 11 is intergrally attached at its peripheral edge to a continuous sheet 12 of transparent plastic forming with the side wall 11, a pocket or envelope for receiving the operating mechanism of the container. An opening 13 is provided in the top wall of the container portion 10 and guides 14 along parallel sides of opening 13 support a door 15 for closing the opening 13.

A side wall 16 is adapted snugly to fit the open end of the portion 10. The wall 16 may have fixed to it a plate 17 through integral spacers 18. A shaft 19 may be journaled at the one end of plate 17 and it may extend through a boss 17' fixed to the inner surface of wall 16. Shaft 19 may extend through wall 16 and have a handwheel 21 fixed to its outer end. Another plate 20 identical with plate 17 may journal the opposite end of shaft 19, and another boss 17'' may be fixed to the inner surface of wall 11 for journaling said opposite end of shaft 19.

A cylinder 22 is rigidly attached to the inside surface of each of plates 17 and 20 in parallel, transverse, aligned relation. Each cylinder houses a spring 23 that acts against a piston 24 having a bearing element 25 thereon. A shaft 26 extends between, and is journaled in bearing elements 25. The ends of shaft 26 extend through elongated slots 27 in the ends of plates 17 and 20 opposite those supporting shaft 19 and ride in elongated slots in bosses 28 (only one being shown) fixed to the inner surfaces of walls 11 and 16 (see FIG. 4). The construction is such that the springs 23 continually urge shaft 26 away from shaft 19 while maintaining them parallel to each other.

A flexible, endless belt 29, preferably of transparent plastic, surrounds shafts 19 and 26 which may themselves be made from one of the substantially rigid plastics, either in solid form or tubular form having a shaft extending axially therethrough. An idler roll 30 may extend between plates 17 and 20, roll 30 being arranged parallel with shafts 19 and 26 and journaled in said plates. Rows of small permanent magnets 31 are fixed to belt 29 for holding the steel hooks of fishing flies 32.

In assembling the side wall 16 with the operating mechanism into the envelope formed by the portion 10, the free ends of shafts 19 and 26 register with the slotted boss 28 and boss 17'' on the inner surface of wall 11 when the wall 16 snugly fits the opening formed by the continuous sheet 12 of plastic. A leaf spring 33 (FIG. 3)

anchored to plate 17 extends transversely across and between the flights of belt 29 and has a hook 34 at its free end that passes through a hole 35 in plate 20. Hook 34 is adapted to engage a latch 36 fixed to the inner surface of wall 11.

A lever 37 (FIG. 2) pivoted to the plate 20 at point 38 lies between plate 20 and wall 11. It includes a finger 39 that lies between the hook 34 and a finger 40 accessible through opening 13. The depressing of finger 40 raises hook 34 to release it from latch 36 which releases wall 16 and the operating mechanism so that it can be withdrawn from portion 10. The release of finger 40 causes spring 33 to move hook 34 into engagement with latch 36 when reassembling the apparatus. An eye 41 may be attached to portion 10 for connecting the container to means for supporting it from the apparel of the user.

From the foregoing it is evident that with the container loaded with flies on the magnets 31, the user merely turns handwheel 21 until the desired fly is at the opening 13 whereupon door 15 is opened to permit removal of the fly. Should flies become dislodged or the interior of the container require cleaning, it is only necessary to depress finger 40, releasing the wall 16 and the operating parts from wall 11. Furthermore, the springs 23 maintain belt 29 taut at all times so that traction between it and shaft 19 is ensured.

Although the various features of the improved bait box have been shown and described in detail to fully disclose one embodiment of the invention, it will be evident that changes may be made in such details and certain features may be used without others without departing from the principles of the invention.

What is claimed is:

1. A container for holding fishing flies comprising in combination, a side wall attached at its peripheral edge to a sheet of material forming an open sided container; another side wall adapted snugly to fit the open end of said container; spaced parallel shafts having their one ends journaled in means at each end of said other side wall; means on said first side wall for journaling the opposite ends of said shafts; an endless belt surrounding said shafts; means on said belt for supporting fishing flies; first releasable means fixed to said other side wall; and second releasable means fixed to said first side wall; and adapted to cooperate with said first releasable means for releasably securing said side walls to each other spaced apart by said sheet of material.

2. A container for holding fishing flies comprising in combination, a side wall attached at its peripheral edge to a sheet of material forming an open sided container; another side wall adapted snugly to fit the open end of said container; spaced parallel shafts having their one ends journaled in means at each end of said other side wall; means on said first side wall for journaling the opposite ends of said shafts; resilient means for urging said shafts away from each other while maintaining them in parallel relation; an endless belt surrounding said shafts; means on said belt for supporting fishing flies; first releasable means fixed to said other side wall; and second releasable means fixed to said first side wall; and adapted to cooperate with said first releasable means for releasably securing said side walls to each other spaced apart by said sheet of material.

3. A container for holding fishing flies comprising in combination, a side wall attached at its peripheral edge to a continuous sheet of material forming an open sided container; another side wall adapted snugly to fit the open end of said container; spaced parallel shafts having their one ends journaled in means at each end of said side wall; means on said first side wall for journaling the opposite ends of said shafts; an endless belt surrounding said shafts; magnetic means on said belt for supporting fishing flies; first releasable means fixed to said other side wall; and second releasable means fixed to said first side wall; and adapted to cooperate with said first releasable means for releasably securing said side walls to each other spaced apart by said continuous sheet of material.

4. A container for holding fishing flies comprising in combination, a side wall attached at its peripheral edge to a continuous sheet of material forming an open sided container; another side wall adapted snugly to fit the open end of said container; spaced parallel shafts having their one ends journaled in means at each end of said other side wall; means on said first side wall for journaling the opposite ends of said shafts; resilient means for urging said shafts away from each other while maintaining them in parallel relation; an endless belt surrounding said shafts; magnetic means on said belt for supporting fishing flies; first releasable means fixed to said other side wall; and second releasable means fixed to said first side wall; and adapted to cooperate with said first releasable means for releasably securing said side wall to each other spaced apart by said continuous sheet of material.

5. A container for holding fishing flies comprising in combination, a side wall attached at its peripheral edge to a continuous sheet of material forming an open sided container; another side wall adapted snugly to fit the open end of said container; spaced parallel shafts having their one ends journaled in means at each end of said other side wall; means on said first side wall for journaling the opposite ends of said shafts; an endless belt surrounding said shafts; means on said belt for supporting fishing flies; a latch fixed to said first side wall; a leaf spring anchored to said other side wall, said spring having a hook at its free end adapted to cooperate with said latch; and a pivotal lever for releasing said hook from said latch.

6. A container for holding fishing flies comprising in combination, a side wall attached at its peripheral edge to a continuous sheet of material forming an open sided container; another side wall adapted snugly to fit the open end of said container; spaced parallel shafts having their one ends journaled in means at each end of said other side wall; means on said first side wall for journaling the opposite ends of said shafts; resilient means for urging said shafts away from each other while maintaining them in parallel relation; an endless belt surrounding said shafts; means on said belt for supporting fishing flies; a latch fixed to said first side wall; a leaf spring anchored to said other side wall, said spring having a hook at its free end adapted to cooperate with said latch; and a pivotal lever for releasing said hook from said latch.

7. A container for holding fishing flies comprising in combination, a side wall attached at its peripheral edge to a sheet of material forming an open sided container; another side wall adapted snugly to fit the open end of said container; spaced parallel shafts having their one ends journaled in means at each end of said other side wall; means on said first side wall for journaling the opposite ends of said shafts; an endless belt surrounding said shafts; magnetic means on said belt for supporting fishing flies; a latch fixed to said first side wall; a leaf spring anchored to said other side wall, said spring having a hook at its free end adapted to cooperate with said latch; and a pivotal lever for releasing said hook from said latch.

8. A container for holding fishing flies comprising in combination, a side wall attached at its peripheral edge to a sheet of material forming an open sided container; another side wall adapted snugly to fit the open end of said container; spaced parallel shafts having their one ends journaled in means at each end of said other side wall; means on said first side wall for journaling the opposite ends of said shafts; an endless belt surrounding said shafts; means on said belt for supporting fishing flies; first releasable means fixed to said other side wall; and second releasable means fixed to said first side wall; and adapted to cooperate with said first releasable means for releasably securing said side walls to each other spaced apart by said sheet of material; an opening in said sheet of material; and a door for closing said opening.

9. A container for holding fishing flies comprising in combination, a first side wall attached at its peripheral edge to a sheet of material forming an open sided container; a second side wall adapted snugly to fit the open end of said container; spaced parallel shafts having their one ends journaled in means at each end of said second side wall; means on said first side wall for journaling the opposite ends of said shafts; a flexible endless belt surrounding said shafts; permanent magnetic means on said belt for supporting fishing flies; releasable means fixed on one of said side walls; and latch means on the other of said side walls for engaging said releasable means so as to releasably secure said side walls to each other spaced apart by said sheet of material.

References Cited by the Examiner

UNITED STATES PATENTS

| | | | |
|---|---|---|---|
| 499,142 | 6/1893 | Neff. | |
| 1,494,294 | 5/1924 | Sheridan et al. | 95—31 |
| 2,080,614 | 5/1937 | Lee | 40—96 X |
| 2,246,626 | 6/1941 | Grandin | 43—57.5 |
| 2,540,340 | 2/1951 | Linblade | 43—57.5 |
| 2,669,799 | 2/1954 | Stiteler | 43—57.5 |

SAMUEL KOREN, *Primary Examiner.*

ALDRICH F. MEDBERY, *Examiner.*

D. J. LEACH, *Assistant Examiner.*

UNITED STATES PATENT OFFICE
CERTIFICATE OF CORRECTION

Patent No. 3,286,390            November 22, 1966

Frank L. Guice

It is hereby certified that error appears in the above numbered patent requiring correction and that the said Letters Patent should read as corrected below.

Column 2, line 13, for "view" read -- view, --; column 3, line 8, for "between" read -- beneath --; line 69, before "side" insert -- other Signed and sealed this 12th day of September 1967.

(SEAL)
Attest:

ERNEST W. SWIDER            EDWARD J. BRENNER
Attesting Officer            Commissioner of Patents